US012698760B2

(12) United States Patent
Landa et al.

(10) Patent No.:  US 12,698,760 B2
(45) Date of Patent:  Aug. 4, 2026

(54) SYSTEM AND METHOD FOR PROVIDING GEARBOX LUBRICATION OF A WIND TURBINE DURING AN OFF-GRID STATE

(71) Applicant: GE Infrastructure Technology LLC, Greenville, SC (US)

(72) Inventors: Bernard P. Landa, Clifton Park, NY (US); James H. Madge, Simpsonville, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 3 days.

(21) Appl. No.: 18/817,452

(22) Filed: Aug. 28, 2024

(65) Prior Publication Data

US 2026/0063112 A1  Mar. 5, 2026

(51) Int. Cl.
*F03D 80/70*  (2016.01)

(52) U.S. Cl.
CPC ........ *F03D 80/707* (2023.08); *F05B 2260/98* (2013.01); *F05B 2270/337* (2013.01)

(58) Field of Classification Search
CPC ..... F03D 80/70; F03D 80/707; F05B 2260/98
See application file for complete search history.

(56) References Cited

U.S. PATENT DOCUMENTS

| | | | | | |
|---|---|---|---|---|---|
| 4,119,863 | A | * | 10/1978 | Kelly | F03D 15/10 |
| | | | | | 136/246 |
| 5,199,528 | A | * | 4/1993 | Rinaldo | F01M 1/18 |
| | | | | | 184/6.4 |
| 7,387,189 | B2 | * | 6/2008 | James | F01D 21/14 |
| | | | | | 184/6.11 |
| 8,118,536 | B2 | * | 2/2012 | Krauss | F03D 80/70 |
| | | | | | 415/17 |

(Continued)

FOREIGN PATENT DOCUMENTS

| | | |
|---|---|---|
| CA | 2885556 C | 5/2017 |
| CN | 111051695 B | 5/2022 |

(Continued)

OTHER PUBLICATIONS

EPO Search Report, Jan. 29, 2026.

*Primary Examiner* — Michael A Riegelman
(74) *Attorney, Agent, or Firm* — Dority & Manning, P.A.

(57) ABSTRACT

A method for providing gearbox lubrication of a wind turbine during an off-grid state includes fluidly coupling an auxiliary lubrication system with a gearbox of the wind turbine. The off-grid state is characterized in that the wind turbine is mechanically and electrically installed at a wind farm but not yet connected to a grid. The method also includes determining a time-based control scheme for the auxiliary lubrication system to provide lubrication to the auxiliary lubrication system during the off-grid state. The time-based control scheme is defined a first time period in (Continued)

100

102
FLUIDLY COUPLE AN AUXILIARY LUBRICATION SYSTEM WITH A GEARBOX OF THE WIND TURBINE

104
DETERMINE A TIME-BASED CONTROL SCHEME FOR THE AUXILIARY LUBRICATION SYSTEM TO PROVIDE LUBRICATION TO THE AUXILIARY LUBRICATION SYSTEM DURING THE OFF-GRID STATE, THE TIME-BASED CONTROL SCHEME DEFINING A FIRST TIME PERIOD IN WHICH THE LUBRICATION IS PROVIDED TO THE GEARBOX VIA THE AUXILIARY LUBRICATION SYSTEM DURING THE OFF-GRID STATE AND A SECOND TIME PERIOD IN WHICH THE LUBRICATION IS NOT PROVIDED TO THE GEARBOX VIA THE AUXILIARY LUBRICATION SYSTEM DURING THE OFF-GRID STATE, THE FIRST TIME PERIOD BEING LESS THAN THE SECOND TIME PERIOD

106
IMPLEMENT, VIA A CONTROLLER, THE CONTROL SCHEME FOR THE AUXILIARY LUBRICATION SYSTEM TO PROVIDE THE LUBRICATION TO THE GEARBOX OF THE WIND TURBINE DURING THE OFF-GRID STATE which the lubrication is provided to the gearbox via the auxiliary lubrication system during the off-grid state and a second time period in which the lubrication is not provided to the gearbox via the auxiliary lubrication system during the off-grid state. The first time period is less than the second time period. Further, the method includes implementing, via a controller, the control scheme for the auxiliary lubrication system to provide the lubrication to the gearbox of the wind turbine during the off-grid state.

20 Claims, 7 Drawing Sheets

(56) References Cited

U.S. PATENT DOCUMENTS

| | | | | |
|---|---|---|---|---|
| 8,288,884 | B1 * | 10/2012 | Malcolm | F03D 9/25 |
| | | | | 290/55 |
| 8,330,296 | B2 * | 12/2012 | Ottman | F03D 13/25 |
| | | | | 307/72 |
| 8,365,866 | B2 * | 2/2013 | Ciszak | F03D 80/70 |
| | | | | 184/6.12 |
| 8,378,621 | B2 * | 2/2013 | Singhal | F03D 9/25 |
| | | | | 136/246 |
| 8,938,967 | B2 * | 1/2015 | McMaster | F03D 9/007 |
| | | | | 290/55 |
| 8,939,259 | B2 * | 1/2015 | Mallada | F16H 57/0412 |
| | | | | 184/6.12 |
| 9,797,504 | B2 * | 10/2017 | Hidding | H02K 7/1838 |
| 10,644,579 | B2 * | 5/2020 | Nerubenko | F16F 15/02 |
| 11,512,681 | B2 * | 11/2022 | Rogg | F16H 57/045 |
| 11,585,326 | B2 * | 2/2023 | Hawkins | F03D 80/70 |
| 2007/0098567 | A1 * | 5/2007 | Johnson | F04C 11/00 |
| | | | | 417/199.1 |

| | | | | |
|---|---|---|---|---|
| 2011/0168494 | A1 * | 7/2011 | Subramaniam | F03D 80/70 |
| | | | | 184/6.12 |
| 2011/0168495 | A1 * | 7/2011 | Subramaniam | F03D 80/70 |
| | | | | 184/6.12 |
| 2012/0134808 | A1 * | 5/2012 | Lindberg | F03D 80/70 |
| | | | | 416/1 |
| 2012/0211307 | A1 * | 8/2012 | Nielsen | F03D 80/70 |
| | | | | 184/4 |
| 2013/0288843 | A1 * | 10/2013 | Baum | F16H 57/0436 |
| | | | | 184/14 |
| 2015/0139820 | A1 * | 5/2015 | Leimann | F04B 23/08 |
| | | | | 417/53 |
| 2016/0298609 | A1 * | 10/2016 | Bogaert | F16H 57/0436 |
| 2017/0059031 | A1 * | 3/2017 | Doertoluk | F03D 80/70 |
| 2018/0023547 | A1 * | 1/2018 | Jeffus | F03D 9/25 |
| | | | | 290/44 |
| 2020/0116134 | A1 * | 4/2020 | Rogg | F03D 15/10 |
| 2020/0124033 | A1 * | 4/2020 | Rogg | F16H 57/045 |
| 2020/0166017 | A1 * | 5/2020 | Hansen | F03D 7/0224 |
| 2021/0088029 | A1 * | 3/2021 | Rogg | F03D 15/00 |
| 2021/0115906 | A1 | 4/2021 | Nies | |
| 2021/0270249 | A1 | 9/2021 | Pedersen et al. | |
| 2023/0184215 | A1 | 6/2023 | Sala et al. | |
| 2026/0063107 | A1 * | 3/2026 | Landa | F03D 9/10 |
| 2026/0063112 | A1 * | 3/2026 | Landa | F03D 80/70 |

FOREIGN PATENT DOCUMENTS

| | | |
|---|---|---|
| DE | 102009053840 A1 | 5/2011 |
| DK | 2317136 T3 | 8/2015 |
| EP | 1783364 A2 | 5/2007 |
| EP | 2570663 A2 | 3/2013 |
| EP | 2657515 A1 | 10/2013 |
| EP | 3040553 A1 | 7/2016 |
| EP | 2895786 B1 | 11/2016 |
| EP | 2146095 B2 | 5/2019 |
| EP | 4 083 413 A1 | 11/2022 |
| EP | 4219937 A1 | 8/2023 |

* cited by examiner

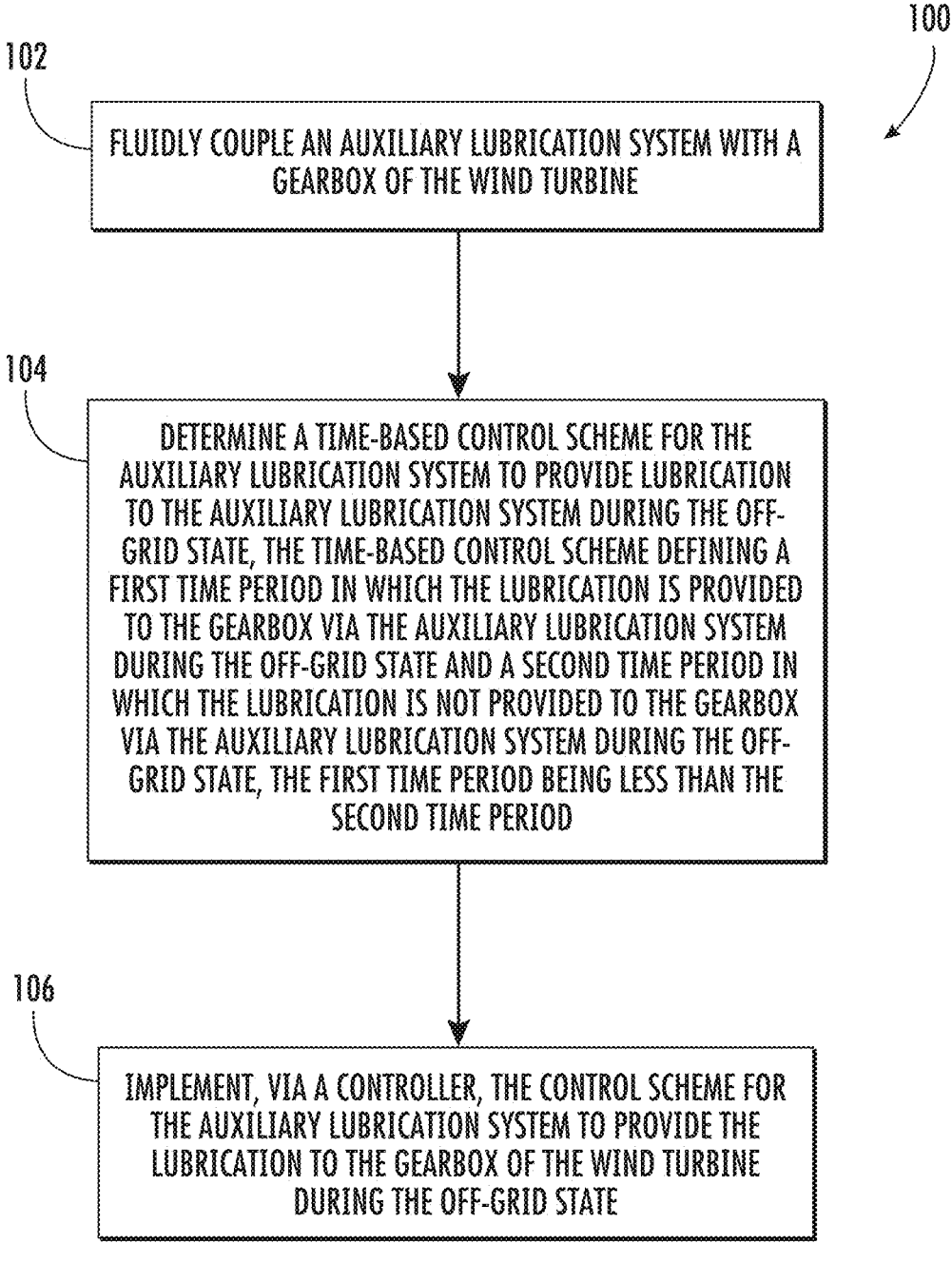

102

100

FLUIDLY COUPLE AN AUXILIARY LUBRICATION SYSTEM WITH A GEARBOX OF THE WIND TURBINE

104

DETERMINE A TIME-BASED CONTROL SCHEME FOR THE AUXILIARY LUBRICATION SYSTEM TO PROVIDE LUBRICATION TO THE AUXILIARY LUBRICATION SYSTEM DURING THE OFF-GRID STATE, THE TIME-BASED CONTROL SCHEME DEFINING A FIRST TIME PERIOD IN WHICH THE LUBRICATION IS PROVIDED TO THE GEARBOX VIA THE AUXILIARY LUBRICATION SYSTEM DURING THE OFF-GRID STATE AND A SECOND TIME PERIOD IN WHICH THE LUBRICATION IS NOT PROVIDED TO THE GEARBOX VIA THE AUXILIARY LUBRICATION SYSTEM DURING THE OFF-GRID STATE, THE FIRST TIME PERIOD BEING LESS THAN THE SECOND TIME PERIOD

106

IMPLEMENT, VIA A CONTROLLER, THE CONTROL SCHEME FOR THE AUXILIARY LUBRICATION SYSTEM TO PROVIDE THE LUBRICATION TO THE GEARBOX OF THE WIND TURBINE DURING THE OFF-GRID STATE

FIG. 5

SYSTEM AND METHOD FOR PROVIDING GEARBOX LUBRICATION OF A WIND TURBINE DURING AN OFF-GRID STATE

FIELD

The present disclosure relates in general to wind turbine power generating systems, and more particularly to systems and methods for providing gearbox lubrication of a wind turbine during an off-grid state required during idle maintenance of a wind turbine.

BACKGROUND

Wind power is considered one of the cleanest, most environmentally friendly energy sources presently available, and wind turbines have gained increased attention in this regard. A modern wind turbine typically includes a nacelle fixed atop a tower, a generator and a gearbox housed with the nacelle, and a rotor configured with the nacelle having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid. Modern wind turbines also include a turbine controller for controlling operation thereof.

A plurality of wind turbines may also be arranged in a common geographical location referred to as a wind farm. The wind farm may be connected to a grid for supplying power thereto. However, at installation, there is a time frame whereby the wind turbine(s) is mechanically and electrically complete without a grid interconnect available. This state of the wind turbines/wind farm is generally referred to as an "off-grid state." The time frame of the off-grid state can be days, weeks, months, or even years depending on a number of factors particular to the wind farm site, such as grid availability, grid code requirements, incentives, tax credits, etc. In such instances, the wind turbine(s) of the wind farm require various idle maintenance tasks while off-grid and in a state of vertical storage (i.e., installed but not operational). For example, drivetrain components, namely the gearbox, have multiple rotating interfaces in the form of gear meshes and shaft bearings that need lubrication.

In view of the aforementioned, the present disclosure is directed to systems and methods for providing gearbox lubrication of a wind turbine during an off-grid state.

BRIEF DESCRIPTION

Aspects and advantages of the present disclosure will be set forth in part in the following description, or may be obvious from the description, or may be learned through practice of the present disclosure.

In an aspect, the present disclosure is directed to a method for providing gearbox lubrication of a wind turbine during an off-grid state includes fluidly coupling an auxiliary lubrication system with a gearbox of the wind turbine. The off-grid state is characterized in that the wind turbine is mechanically and electrically installed at a wind farm but not yet connected to a grid. The method also includes determining a time-based control scheme for the auxiliary lubrication system to provide lubrication to the auxiliary lubrication system during the off-grid state. The time-based control scheme is defined a first time period in which the lubrication is provided to the gearbox via the auxiliary lubrication system during the off-grid state and a second time period in which the lubrication is not provided to the gearbox via the auxiliary lubrication system during the off-grid state. The first time period is less than the second time period. Further, the method includes implementing, via a controller, the control scheme for the auxiliary lubrication system to provide the lubrication to the gearbox of the wind turbine during the off-grid state.

In another aspect, the present disclosure is directed to a gearbox assembly for a wind turbine. The wind turbine is in an off-grid state characterized in that the wind turbine is mechanically and electrically installed on site, but not yet connected to a grid. The gearbox assembly includes a gearbox, an auxiliary lubrication system fluidly coupled with the gearbox, and a controller in communication with the auxiliary lubrication system. The controller is configured to perform a plurality of operations, including but not limited to determining a time-based control scheme for the auxiliary lubrication system to provide lubrication to the auxiliary lubrication system during the off-grid state. The time-based control scheme is defined a first time period in which the lubrication is provided to the gearbox via the auxiliary lubrication system during the off-grid state and a second time period in which the lubrication is not provided to the gearbox via the auxiliary lubrication system during the off-grid state. The first time period is less than the second time period. The plurality of operations further include implementing the control scheme for the auxiliary lubrication system to provide the lubrication to the gearbox of the wind turbine during the off-grid state.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure, including the best mode thereof, directed to one of ordinary skill in the art, is set forth in the specification, which makes reference to the appended figures, in which:

FIG. 5 illustrates a flow diagram of an embodiment of a method for providing gearbox lubrication of a wind turbine during an off-grid state according to the present disclosure;

Figure 1:
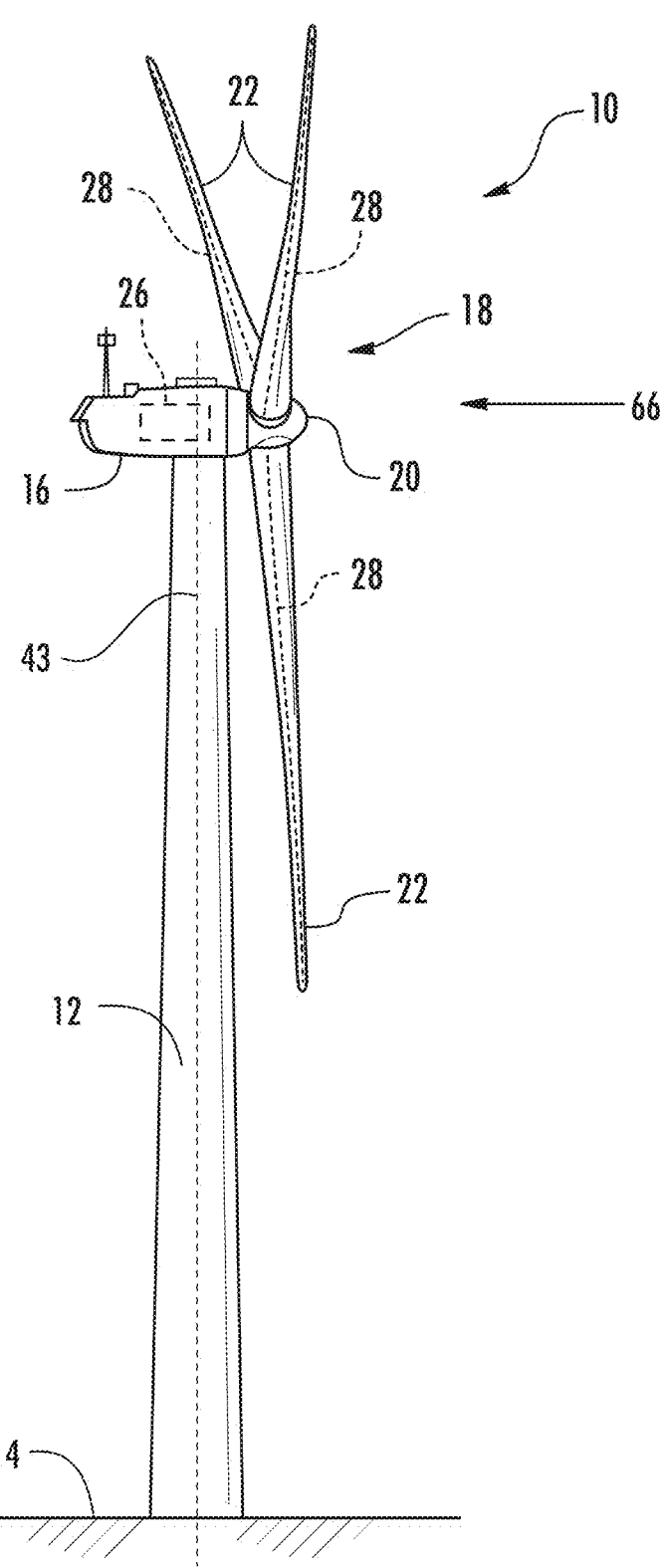
FIG. 1 illustrates a perspective view of an embodiment of a wind turbine according to the present disclosure.

Repeat use of reference characters in the present specification and drawings is intended to represent the same or analogous features or elements of the present disclosure.

DETAILED DESCRIPTION

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of an embodiment can be used with another embodiment to yield a still further embodiment. Thus, it is intended that the present disclosure covers such modifications and variations as come within the scope of the appended claims and their equivalents.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

In general, the present disclosure is directed to systems and methods for providing gearbox lubrication of a wind turbine during an off-grid state. In particular, systems and methods of the present disclosure provide lubrication of the gearbox in an off-grid or vertical storage configuration with a separate, right-sized motor and pump system. Controls are applied for operation of the hydraulic lubrication system, thereby making use of selective criteria based on duration of time, rotational loads, rotor pinwheeling, environmental conditions, etc. Monitoring of operating setpoints and sensors provides a confirmation of idle maintenance effectiveness of gearbox components for off-grid conditions. Such monitoring may be implemented locally or remotely. Remote monitoring and/or control frequency and duration schemes can also be implemented. In certain embodiments, visual indicators with the use of beacon lights for multiple operating states may be used on each wind turbine. Where cellular connectivity is available, remote monitoring can be utilized through IoT cloud-based portals.

Referring now to the drawings, FIG. 1 illustrates a perspective view of an embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24

(FIG. 2) positioned within the nacelle 16 to permit electrical energy to be produced during normal operation of the wind turbine 10.

Figure 2:
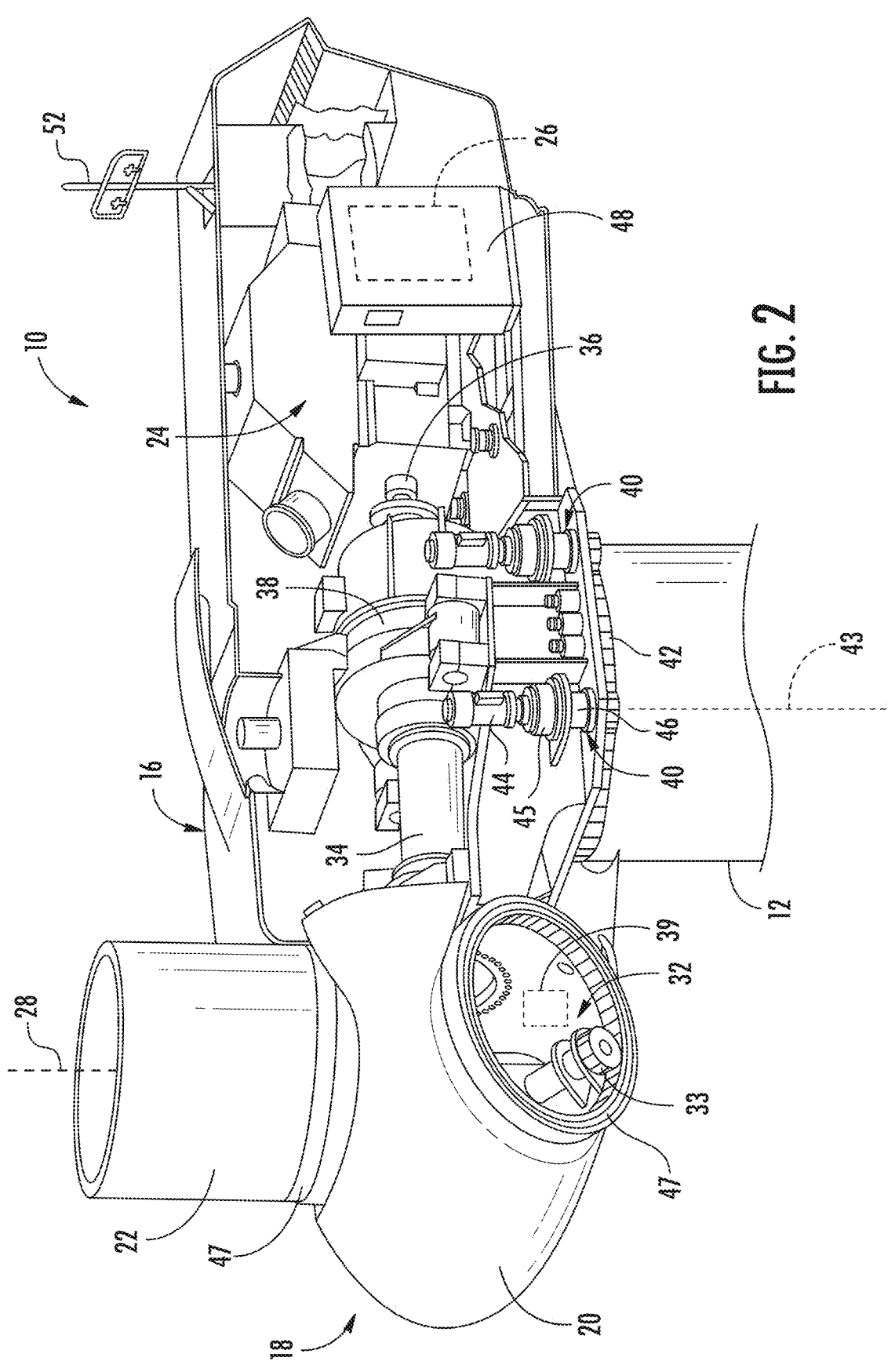
FIG. 2 illustrates a simplified, internal view of an embodiment of a nacelle according to the present disclosure.

The wind turbine 10 may also include a turbine controller 26 centralized within the nacelle 16. For example, as shown, the turbine controller 26 is located in a top box cabinet 48 (FIG. 2). However, in other embodiments, the turbine controller 26 may be located within any other component of the wind turbine 10 or at a location outside the wind turbine 10. Further, the turbine controller 26 may be communicatively coupled to any number of the components of the wind turbine 10 or be distributed in order to control the operation of such components and/or implement a control action. As such, the turbine controller 26 may include a computer or other suitable processing unit. Thus, in several embodiments, the controller 26 may include suitable computer-readable instructions that, when implemented, configure the turbine controller 26 to perform various different functions, such as receiving, transmitting, and/or executing wind turbine control action signals, receiving, and analyzing sensor signals, and generating message signals.

By transmitting and executing wind turbine control action signals, the turbine controller 26 may generally be configured to control the various operating modes (e.g., start-up or shut-down sequences) and/or components of the wind turbine 10. For example, the controller 26 may be configured to control the yaw direction of the nacelle 16 about a yaw axis 43 to position the rotor blades 22 with respect to the direction 66 of the wind, thereby controlling the power output generated by the wind turbine 10. For example, as is described in greater detail herein, the turbine controller 26 may be configured to transmit control action signals/commands to one or more yaw drive mechanisms 40 (FIG. 2) of the wind turbine 10 such that the nacelle 16 may be rotated about the yaw axis 43. The turbine controller 26, which may be a part of the turbine control circuit or entirely separate, may also operate auxiliary systems in the wind turbine 10, such as pumps and motors, in order to periodically cycle mechanical and electrical systems during off-grid exposure.

Referring now to FIG. 2, a simplified, internal view of an embodiment of the nacelle 16 of the wind turbine 10 shown in FIG. 1 is illustrated. As shown, the generator 24 may be disposed within the nacelle 16. In general, the generator 24 may be coupled to the rotor 18 for producing electrical power from the rotational energy generated by the rotor 18 during operation of the wind turbine 10. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The rotor shaft 34 usually comprises a flange 35 that facilitates mechanical engagement of the rotor shaft 34 to the hub 20. The gearbox 38 opposite the hub 20 may then be configured to convert the low speed, high torque input to a high speed, low torque output to drive the generator shaft 36 and, thus, the generator 24.

The nacelle 16 may include a yaw drive mechanism 40 configured to change the angle of the nacelle 16 relative to the wind (e.g., by engaging a yaw bearing 42 of the wind turbine 10 that is arranged between the nacelle 16 and the tower 12 of the wind turbine 10). Further, each yaw drive mechanism 40 may include a yaw drive motor 44 (e.g., any suitable electric or hydraulic motor), a yaw drive gearbox 45, and a yaw drive pinion 46. In such embodiments, the yaw drive motor 44 may be coupled to the yaw drive gearbox 45 so that the yaw drive motor 44 imparts mechanical force to the yaw drive gearbox 45. Similarly, the yaw drive gearbox 45 may be coupled to the yaw drive pinion 46 for rotation therewith. The yaw drive pinion 46 may, in turn, be in rotational engagement with the yaw bearing 42 coupled between the tower 12 and the nacelle 16 such that rotation of the yaw drive pinion 46 causes rotation of the yaw bearing 42. Thus, in such embodiments, rotation of the yaw drive motor 44 drives the yaw drive gearbox 45 and the yaw drive pinion 46, thereby rotating the yaw bearing 42 and the nacelle 16 about the yaw axis 43. Similarly, the wind turbine 10 may include a pitch system 32 having one or more pitch adjustment mechanisms 33 communicatively coupled to the wind turbine controller 26, with each pitch adjustment mechanism(s) 33 being configured to rotate the pitch bearing 47 and thus the individual rotor blade(s) 22 about the pitch axis 28.

The pitch adjustment mechanism(s) 33 described herein may have any suitable arrangement. In addition, the pitch adjustment mechanism(s) 33 may include a pitch motor, a pitch gearbox, and a pitch pinion. Furthermore, as shown, the pitch system 32 may also include a pitch system storage medium 39. In such embodiments, the pitch system storage medium 39 may include a battery, an ultracapacitor, and/or any other suitable storage medium.

In addition, the wind turbine 10 may also include one or more sensors 52 for monitoring various wind conditions of the wind turbine 10 and one or more sensor 37 for sensing load conditions acting on the wind turbine. For example, as shown in FIG. 2, the wind direction, wind speed, or any other suitable wind condition near the wind turbine 10 may be measured, such as through use of a suitable weather sensor 52. Suitable weather sensors 52 include, for example, Light Detection and Ranging ("LIDAR") devices, Sonic Detection and Ranging ("SODAR") devices, anemometers, wind vanes, barometers, radar devices (such as Doppler radar devices), Meteorological (Met) Mast systems, or any other in situ or remote sensing device(s) or system(s) that can provide weather, pressure, or wind information now known or later developed in the art.

Figure 3:
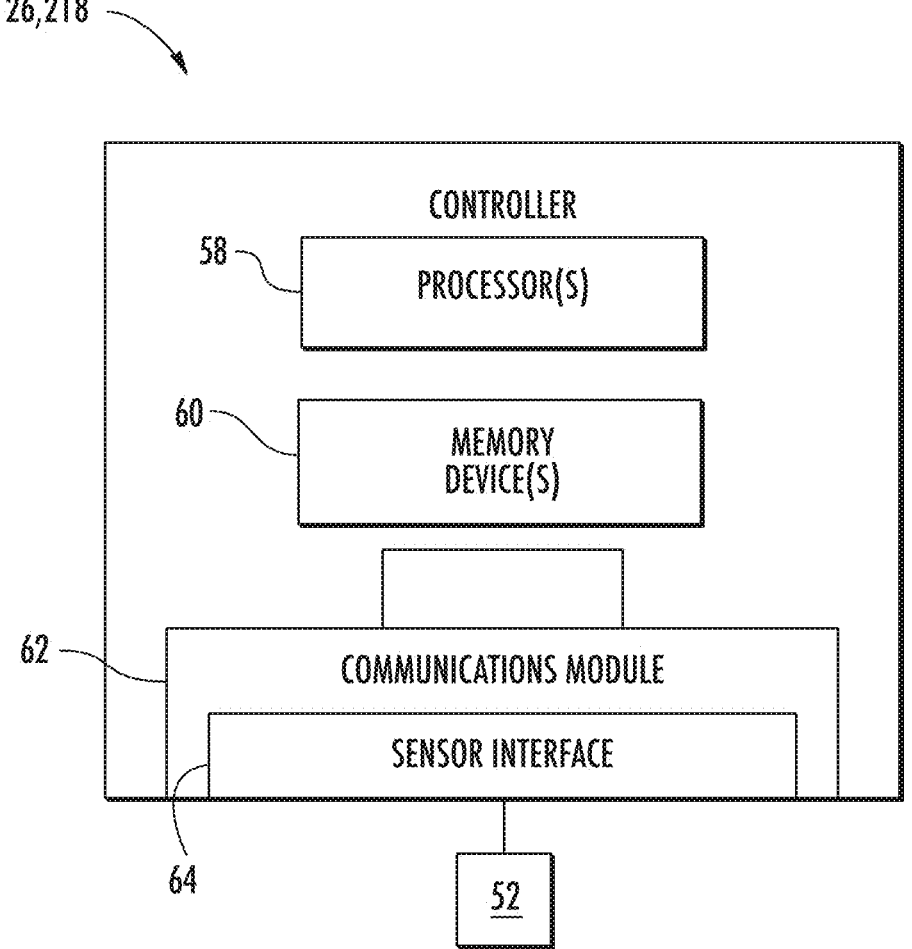
FIG. 3 illustrates a schematic diagram of an embodiment of a main controller of a wind turbine according to the present disclosure.

Referring now to FIG. 3, a block diagram of an embodiment of a controller (such as the turbine controller 26 or controller 218 described herein below) according to the present disclosure is illustrated. As shown, the controller may include a computer or other suitable processing unit that may include suitable computer-readable instructions that, when implemented, configure the controller to perform various different functions, such as receiving, transmitting, and/or executing wind turbine control action signals. More specifically, as shown, there is illustrated a block diagram of an embodiment of suitable components that may be included within the controller in accordance with example aspects of the present disclosure. As shown, the controller may include one or more processor(s) 58 and associated memory device (s) 60 configured to perform a variety of computer-implemented functions (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), physically configured settings with dip or rotary switches, and/or other suitable memory elements.

Such memory device(s) 60 may generally be configured to store suitable computer-readable instructions that, when implemented by the processor(s) 58, configure the controller to perform various functions as described herein. Additionally, the controller may also include a communications interface 62 to facilitate communications between the controller and the various components of the wind turbine 10. The communications interface 62 can support a combination of open loop or closed loop feedback between sensors or other communication modules. An interface can include one or more circuits, terminals, pins, contacts, conductors, or other components for sending and receiving control action signals. Moreover, the controller may include a sensor interface 64 (e.g., one or more analog-to-digital converters) to permit signals transmitted from the sensors to be converted into signals that can be understood and processed by the processors 58.

Figure 4:
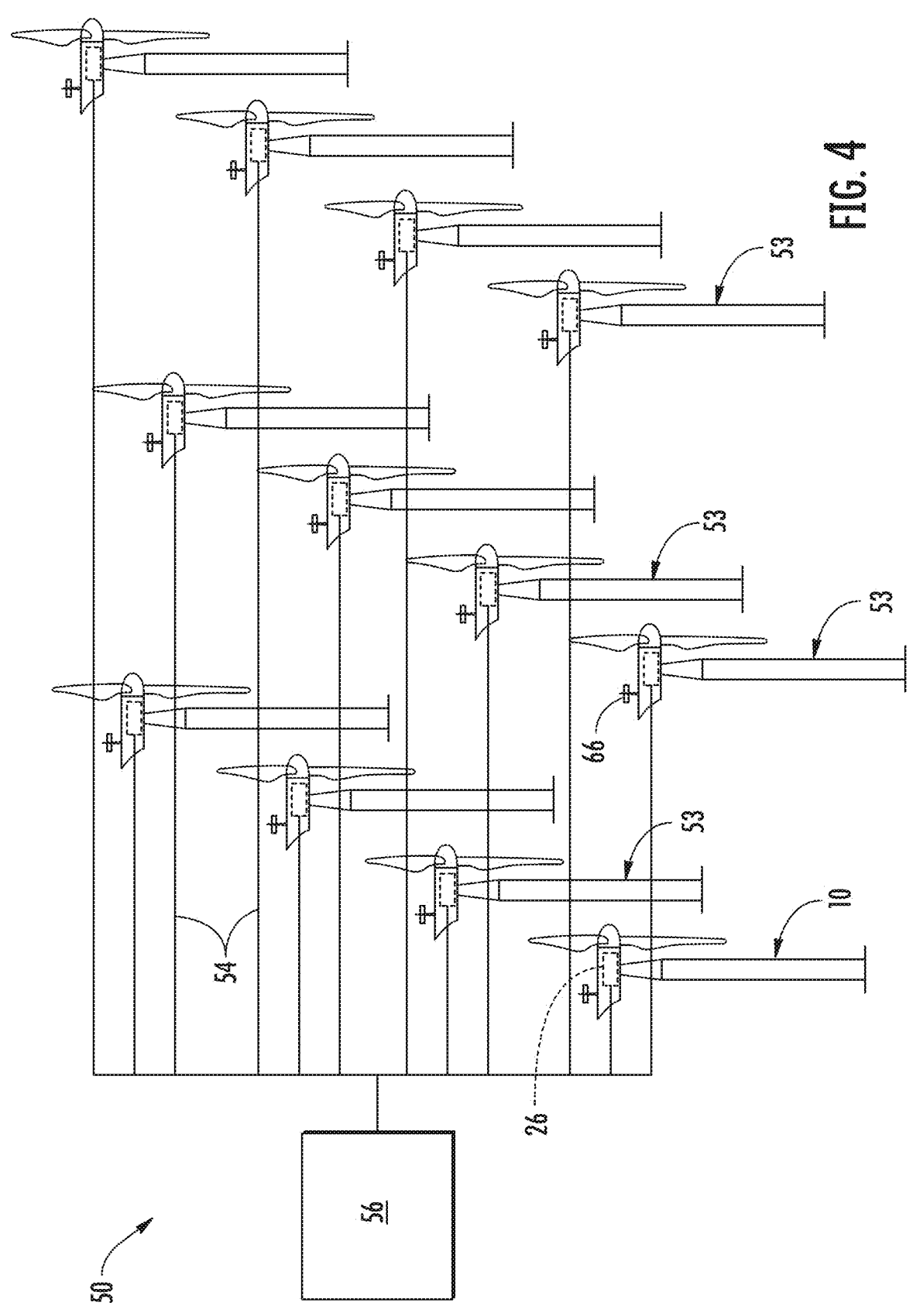
FIG. 4 illustrates a schematic view of an embodiment of a wind farm having a plurality of wind turbines according to the present disclosure.

Referring now to FIG. 4, the wind turbine 10 described herein may be part of a wind farm 50. As shown, the wind farm 50 may include a plurality of wind turbines 53, including the wind turbine 10 described above, and an overall farm-level controller 56. For example, as shown in the illustrated embodiment, the wind farm 50 includes twelve wind turbines, including the wind turbine 10. However, in other embodiments, the wind farm 50 may include any other number of wind turbines, such as less than twelve wind turbines or greater than twelve wind turbines. In an embodiment, the turbine controllers of the plurality of wind turbines 53 are communicatively coupled to the farm-level controller 56, e.g., through a wired connection, such as by connecting the turbine controller 26 through suitable communicative links 54 (e.g., a suitable cable). Alternatively, the turbine controllers may be communicatively coupled to the farm-level controller 56 through a wireless connection, such as by using any suitable wireless communications protocol known in the art. In further embodiments, the farm-level controller 56 is configured to send and receive control signals to and from the various wind turbines 53.

Referring now to FIG. 5, a flow diagram of an embodiment of a method 100 for providing gearbox lubrication of a wind turbine during an off-grid state is illustrated according to the present disclosure. As used herein, the off-grid state characterized in that the wind turbine is mechanically and electrically installed at the wind farm but not yet connected to a grid. In general, the method 100 is described herein with reference to the wind turbine 10 and the wind farm 50 of FIGS. 1-4. However, it should be appreciated that the disclosed method 100 may be implemented with any wind turbines having any other suitable configurations. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Figure 6:
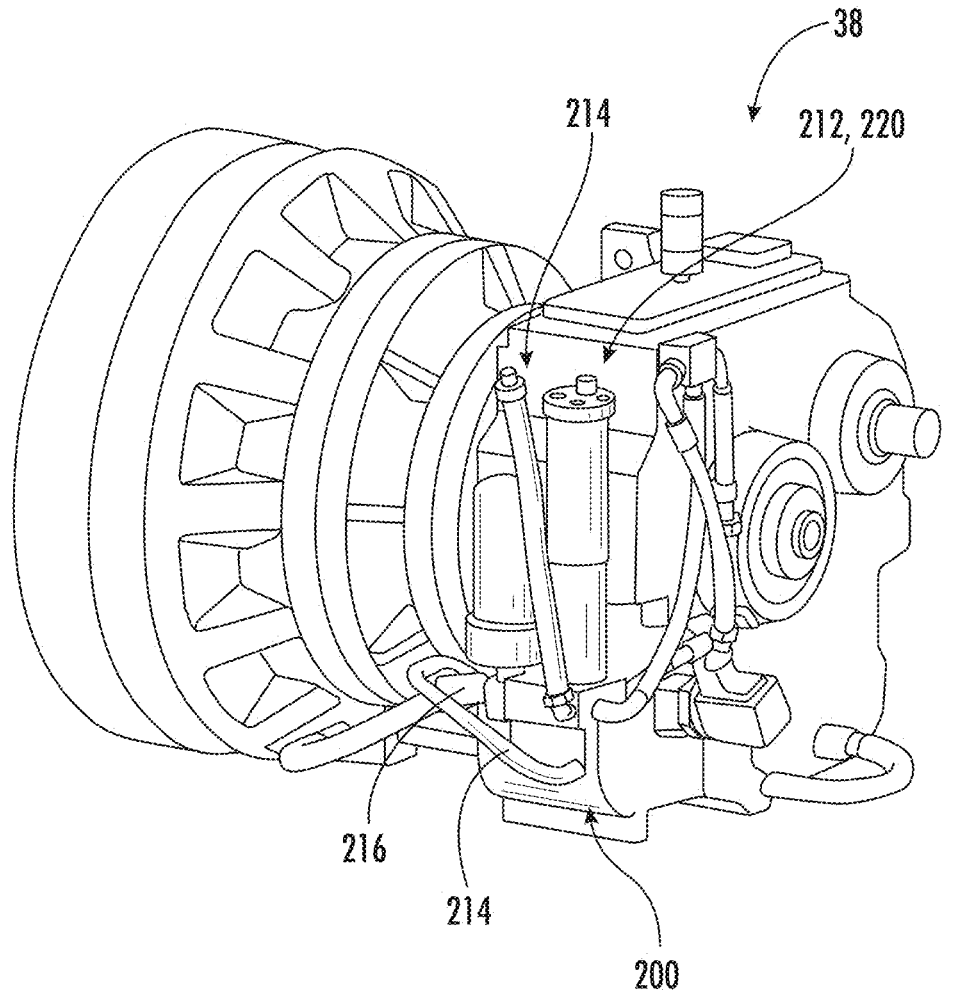
FIG. 6 illustrates a perspective view of an embodiment of a gearbox of a wind turbine according to the present disclosure, particularly illustrating an auxiliary lubrication system coupled thereto.
Figure 7:
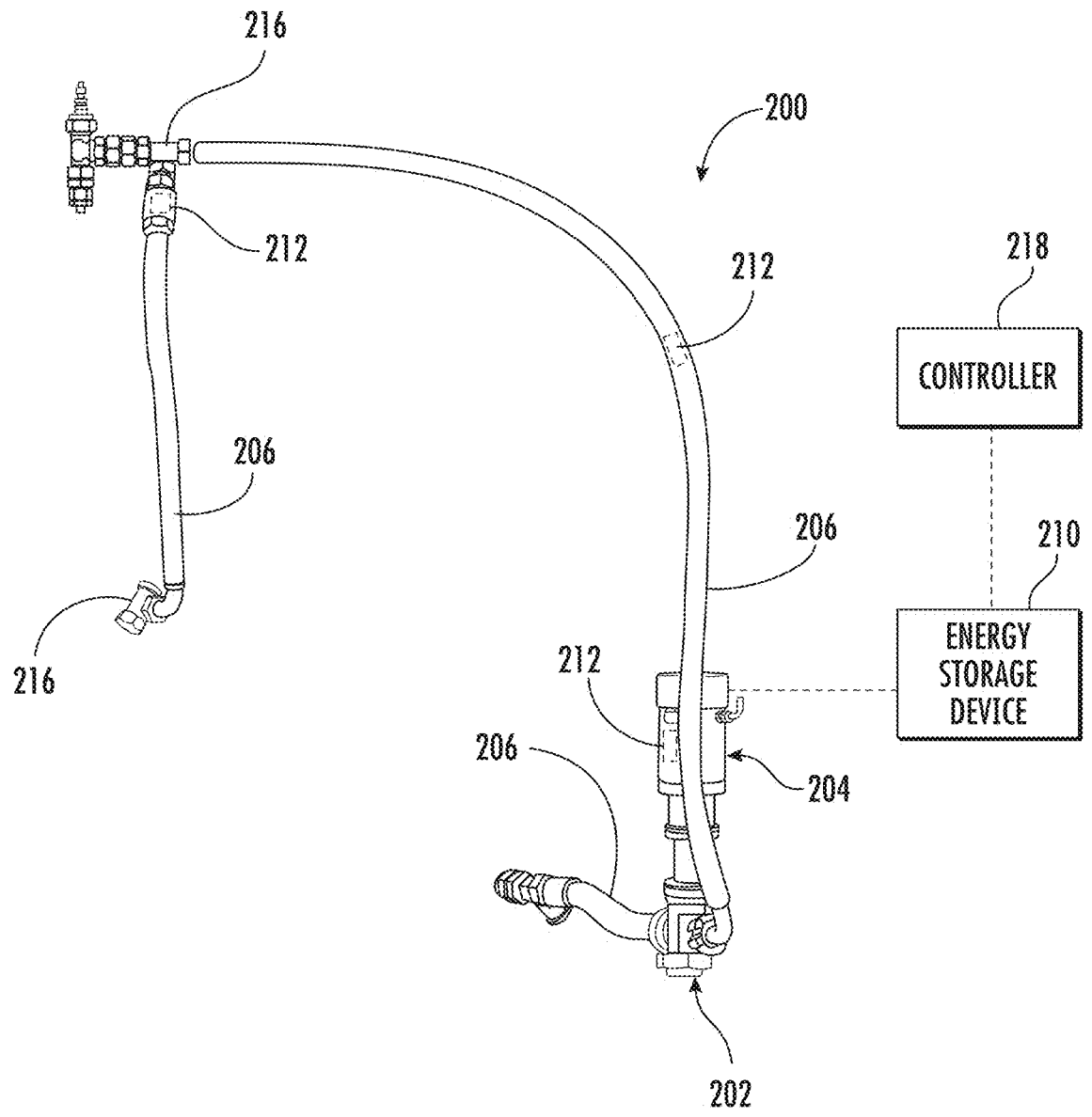
FIG. 7 illustrates a schematic view of an embodiment of an auxiliary lubrication system for a gearbox of a wind turbine for providing lubrication to the gearbox during an off-grid state according to the present disclosure.

As shown at (102), the method 100 includes fluidly coupling an auxiliary lubrication system 200 with a gearbox (e.g., gearbox 38) of the wind turbine 10. For example, as shown in FIG. 6, a perspective view of an embodiment of the gearbox 38 of the wind turbine 10 is illustrated, particularly illustrating the auxiliary lubrication system 200 coupled thereto. Further, as shown in FIG. 7, the auxiliary lubrication system 200 includes a pump 202, a pump driver 204 for driving the pump 202, and one or more fluid passageways 206 (e.g., such as supply lines in the form of tubes or pipes) for routing lubrication, or oil, throughout the gearbox 38, and/or one or more filters. In an embodiment, for example, the pump driver 204 may be an electric motor or a geared interface mechanically engaged with one or more rotating components on a high speed shaft (such as generator shaft 36) or a low speed shaft (such as main shaft 34) of a drivetrain of the wind turbine 10 for driving the pump 202. Thus, in an embodiment, the pump driver 204 for driving the pump 202 may generally include a speed increasing or decreasing coupling, which represents a gearbox with two or more gears to allow the motor shaft speed to be reduced for the pump 202 or to be increased for the pump 202.

Still referring to FIG. 7, the auxiliary lubrication system 200 may also include a controller 218 for controlling the various components of the auxiliary lubrication system 200 and an energy storage device 210 for energizing the pump driver 204. In such embodiments, for example, the energy storage device 210 may be a rechargeable battery or an external power source. For example, in an embodiment, the external energy source may be a small, temporary generator or solar radiation from one or more solar panels installed on the wind turbine 10. In additional embodiments, the energy storage device(s) 210 may be an existing pitch system storage medium (e.g., the pitch system storage medium 39 described herein), an existing power converter storage medium in a power converter of the wind turbine 10, or an existing farm-level energy storage medium at the wind farm 50 (such as a storage medium in the farm-level controller 56).

Referring back to FIG. 5, as shown at (104), the method 100 includes determining a time-based control scheme for the auxiliary lubrication system 200 to provide lubrication to the auxiliary lubrication system 200 during the off-grid state. For example, in an embodiment, the time-based control scheme defines a first time period in which the lubrication is provided to the gearbox 38 via the auxiliary lubrication system 200 during the off-grid state and a second time period in which the lubrication is not provided to the gearbox 38 via the auxiliary lubrication system 200 during the off-grid state. Moreover, in such embodiments, the first time period is less than the second time period. In an embodiment, for example, the first time period may be on the order of minutes and the second time period may be on the order or hours or days. In further embodiments, any suitable time period may be chosen for each of the first and second time periods, respectively, with the first time period being less than second time period so as to provide the most efficient lubrication scheme to the gearbox 38. Thus, the first and second time periods can be chosen based on the size of the gearbox 38, parameters of the wind turbine 10, and/or conditions at the wind farm 50.

In particular embodiments, for example, determining the time-based control scheme for the auxiliary lubrication system 200 may further include utilizing selective criteria based on at least one of duration of time, rotational loads, rotor pinwheeling, and/or environmental conditions of the wind turbine 10 to determine the time-based control scheme. In further embodiments, the time-based control scheme may also be tied with a state-of-change of one or more energy storage devices.

Furthermore, in an embodiment, as shown in FIGS. 6 and 7, the auxiliary lubrication system 200 may also include one or more sensors 212. Thus, in such embodiments, the method 100 may include monitoring one or more operating setpoints via the sensor(s) 212 of the auxiliary lubrication system 200 to provide a confirmation of effectiveness of the lubrication of the gearbox during the off-grid state. Moreover, in an embodiment, the operating setpoints may include pressure, flow, temperature, rotation of one or more gearbox components, contamination of the lubrication, or similar.

Referring back to FIG. 5, as shown at (106), the method 100 includes implementing, via the controller 218, the control scheme for the auxiliary lubrication system 200 to provide the lubrication to the gearbox 38 of the wind turbine 10 during the off-grid state. In such embodiments, as shown in FIG. 6, the auxiliary lubrication system 200 provides a lubrication path for the lubrication that interfaces with a main lubrication system 214 of the gearbox 38. As used herein, the main lubrication system 214 is the primary lubrication system used during an on-grid state of the wind turbine 10 (i.e., during normal operation of the wind turbine 10). Thus, in further embodiments, as shown in FIGS. 6 and 7, the auxiliary lubrication system 200 may include one or more check valves 216 with or without pressure regulators (i.e., a one-way valve) for supporting compatibility of the auxiliary lubrication system 200 with the main lubrication system 214. Moreover, in particular embodiments, as shown in FIG. 6, at least one of the sensors may be a pressure sensor 220 positioned at a gearbox interface, which is an inlet for lubrication (e.g., oil) to the main lubrication system 214. In further embodiments, the method 100 may include controlling, via the controller 218, the auxiliary lubrication system 200 autonomously apart from the wind turbine 10 (and thus apart from the main lubrication system 214) during the off-grid state.

Further aspects of the present disclosure are provided by the subject matter of the following clauses:

A method for providing gearbox lubrication of a wind turbine during an off-grid state, the off-grid state characterized in that the wind turbine is mechanically and electrically installed at a wind farm but not yet connected to a grid, the method comprising: fluidly coupling an auxiliary lubrication system with a gearbox of the wind turbine; determining a time-based control scheme for the auxiliary lubrication system to provide lubrication to the auxiliary lubrication system during the off-grid state, the time-based control scheme defining a first time period in which the lubrication is provided to the gearbox via the auxiliary lubrication system during the off-grid state and a second time period in which the lubrication is not provided to the gearbox via the auxiliary lubrication system during the off-grid state, the first time period being less than the second time period; and implementing, via a controller, the control scheme for the auxiliary lubrication system to provide the lubrication to the gearbox of the wind turbine during the off-grid state.

The method of any preceding clause, wherein the auxiliary lubrication system comprises a pump, a pump driver for driving the pump, and one or more fluid passageways for routing the lubrication throughout the gearbox.

The method of any preceding clause, wherein the pump driver comprises at least one of an electric motor or a geared interface mechanically engaged with one or more rotating components on a high speed shaft or a low speed shaft of a drivetrain of the wind turbine for driving the pump.

The method of any preceding clause, wherein the auxiliary lubrication system further comprises an energy storage device for energizing the pump driver, the energy storage device comprising at least one of a rechargeable battery or an external power source.

The method of any preceding clause, wherein the auxiliary lubrication system further comprises one or more sensors.

The method of any preceding clause, further comprising monitoring one or more operating setpoints via the one or more sensors of the auxiliary lubrication system to provide a confirmation of effectiveness of the lubrication of the gearbox during the off-grid state.

The method of any preceding clause, wherein the one or more operating setpoints via the one or more sensors of the auxiliary lubrication system comprise at least one of pressure, flow, temperature, rotation of one or more gearbox components, or contamination of the lubrication.

The method of any preceding clause, wherein determining the time-based control scheme for the auxiliary lubrication system further comprises utilizing selective criteria based on at least one of duration of time, rotational loads, rotor pinwheeling, or environmental conditions of the wind turbine to determine the time-based control scheme.

The method of any preceding clause, wherein the auxiliary lubrication system provides a lubrication path for the lubrication that interfaces with a main lubrication system of the gearbox, the main lubrication system used during an on-grid state of the wind turbine.

The method of any preceding clause, wherein the auxiliary lubrication system further comprises one or more check valves for supporting compatibility of the auxiliary lubrication system with the main lubrication system.

The method of any preceding clause, further comprising controlling, via the controller, the auxiliary lubrication system autonomously apart from the wind turbine during the off-grid state.

A gearbox assembly for a wind turbine, the wind turbine being in an off-grid state, the off-grid state characterized in that the wind turbine is mechanically and electrically installed on site, but not yet connected to a grid, the gearbox assembly comprising: a gearbox; an auxiliary lubrication system fluidly coupled with the gearbox; and a controller in communication with the auxiliary lubrication system, the controller configured to perform a plurality of operations, the plurality of operations comprising: determining a time-based control scheme for the auxiliary lubrication system to provide lubrication to the auxiliary lubrication system during the off-grid state, the time-based control scheme defining a first time period in which the lubrication is provided to the gearbox via the auxiliary lubrication system during the off-grid state and a second time period in which the lubrication is not provided to the gearbox via the auxiliary lubrication system during the off-grid state, the first time period being less than the second time period; and implementing the control scheme for the auxiliary lubrication system to provide the lubrication to the gearbox of the wind turbine during the off-grid state.

The gearbox assembly of any preceding clause, wherein the auxiliary lubrication system further comprises a pump, a pump driver for driving the pump, and one or more fluid passageways for routing the lubrication throughout the gearbox, wherein the pump driver comprises at least one of an electric motor or a geared interface mechanically engaged with one or more rotating components on a high speed shaft or a low speed shaft of a drivetrain of the wind turbine for driving the pump.

The gearbox assembly of any preceding clause, wherein the auxiliary lubrication system further comprises an energy storage device for energizing the pump driver, the energy storage device comprising at least one of a rechargeable battery or an external power source.

The gearbox assembly of any preceding clause, wherein the auxiliary lubrication system further comprises one or more sensors.

The gearbox assembly of any preceding clause, wherein the plurality of operations further comprise monitoring one or more operating setpoints via the one or more sensors of the auxiliary lubrication system to provide a confirmation of effectiveness of the lubrication of the gearbox during the off-grid state.

The gearbox assembly of any preceding clause, wherein the one or more operating setpoints via the one or more sensors of the auxiliary lubrication system comprise at least one of pressure, flow, temperature, rotation of one or more gearbox components, or contamination of the lubrication.

The gearbox assembly of any preceding clause, wherein determining the time-based control scheme for the auxiliary lubrication system further comprises utilizing selective criteria based on at least one of duration of time, rotational loads, rotor pinwheeling, or environmental conditions of the wind turbine to determine the time-based control scheme.

The gearbox assembly of any preceding clause, wherein the auxiliary lubrication system provides a lubrication path for the lubrication that interfaces with a main lubrication system of the gearbox, the main lubrication system used during an on-grid state of the wind turbine.

The gearbox assembly of any preceding clause, wherein the auxiliary lubrication system further comprises one or more check valves for supporting compatibility of the auxiliary lubrication system with the main lubrication system.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for providing gearbox lubrication of a wind turbine during an off-grid state, the off-grid state characterized in that the wind turbine is mechanically and electrically installed at a wind farm but not yet connected to a grid, the method comprising:

fluidly coupling an auxiliary lubrication system with a gearbox of the wind turbine;

determining a time-based control scheme for the auxiliary lubrication system to provide lubrication to the auxiliary lubrication system during the off-grid state, the time-based control scheme defining a first time period in which the lubrication is provided to the gearbox via the auxiliary lubrication system during the off-grid state and a second time period in which the lubrication is not provided to the gearbox via the auxiliary lubrication system during the off-grid state, the first time period being less than the second time period; and implementing, via a controller, the control scheme for the auxiliary lubrication system to provide the lubrication to the gearbox of the wind turbine during the off-grid state.

2. The method of claim 1, wherein the auxiliary lubrication system comprises a pump, a pump driver for driving the pump, and one or more fluid passageways for routing the lubrication throughout the gearbox.

3. The method of claim 2, wherein the pump driver comprises at least one of an electric motor or a geared interface mechanically engaged with one or more rotating components on a high speed shaft or a low speed shaft of a drivetrain of the wind turbine for driving the pump.

4. The method of claim 2, wherein the auxiliary lubrication system further comprises an energy storage device for energizing the pump driver, the energy storage device comprising at least one of a rechargeable battery or an external power source.

5. The method of claim 2, wherein the auxiliary lubrication system further comprises one or more sensors.

6. The method of claim 5, further comprising monitoring one or more operating setpoints via the one or more sensors of the auxiliary lubrication system to provide a confirmation of effectiveness of the lubrication of the gearbox during the off-grid state.

7. The method of claim 6, wherein the one or more operating setpoints via the one or more sensors of the auxiliary lubrication system comprise at least one of pressure, flow, temperature, rotation of one or more gearbox components, or contamination of the lubrication.

8. The method of claim 1, wherein determining the time-based control scheme for the auxiliary lubrication system further comprises utilizing selective criteria based on at least one of duration of time, rotational loads, rotor pinwheeling, or environmental conditions of the wind turbine to determine the time-based control scheme.

9. The method of claim 8, wherein the auxiliary lubrication system further comprises one or more check valves for supporting compatibility of the auxiliary lubrication system with the main lubrication system.

10. The method of claim 1, wherein the auxiliary lubrication system provides a lubrication path for the lubrication that interfaces with a main lubrication system of the gearbox, the main lubrication system used during an on-grid state of the wind turbine.

11. The method of claim 1, further comprising controlling, via the controller, the auxiliary lubrication system autonomously apart from the wind turbine during the off-grid state.

12. A gearbox assembly for a wind turbine, the wind turbine being in an off-grid state, the off-grid state characterized in that the wind turbine is mechanically and electrically installed on site, but not yet connected to a grid, the gearbox assembly comprising:

a gearbox;

an auxiliary lubrication system fluidly coupled with the gearbox; and a controller in communication with the auxiliary lubrication system, the controller configured to perform a plurality of operations, the plurality of operations comprising:

determining a time-based control scheme for the auxiliary lubrication system to provide lubrication to the auxiliary lubrication system during the off-grid state, the time-based control scheme defining a first time period in which the lubrication is provided to the gearbox via the auxiliary lubrication system during the off-grid state and a second time period in which the lubrication is not provided to the gearbox via the auxiliary lubrication system during the off-grid state, the first time period being less than the second time period; and implementing the control scheme for the auxiliary lubrication system to provide the lubrication to the gearbox of the wind turbine during the off-grid state.

13. The gearbox assembly of claim 12, wherein the auxiliary lubrication system further comprises a pump, a pump driver for driving the pump, and one or more fluid passageways for routing the lubrication throughout the gearbox, wherein the pump driver comprises at least one of an electric motor or a geared interface mechanically engaged with one or more rotating components on a high speed shaft or a low speed shaft of a drivetrain of the wind turbine for driving the pump.

14. The gearbox assembly of claim 13, wherein the auxiliary lubrication system further comprises an energy storage device for energizing the pump driver, the energy storage device comprising at least one of a rechargeable battery or an external power source.

15. The gearbox assembly of claim 13, wherein the auxiliary lubrication system further comprises one or more sensors.

16. The gearbox assembly of claim 15, wherein the plurality of operations further comprise monitoring one or more operating setpoints via the one or more sensors of the auxiliary lubrication system to provide a confirmation of effectiveness of the lubrication of the gearbox during the off-grid state.

17. The gearbox assembly of claim 16, wherein the one or more operating setpoints via the one or more sensors of the auxiliary lubrication system comprise at least one of pressure, flow, temperature, rotation of one or more gearbox components, or contamination of the lubrication.

18. The gearbox assembly of claim 12, wherein determining the time-based control scheme for the auxiliary lubrication system further comprises utilizing selective criteria based on at least one of duration of time, rotational loads, rotor pinwheeling, or environmental conditions of the wind turbine to determine the time-based control scheme.

19. The gearbox assembly of claim 12, wherein the auxiliary lubrication system provides a lubrication path for the lubrication that interfaces with a main lubrication system of the gearbox, the main lubrication system used during an on-grid state of the wind turbine.

20. The gearbox assembly of claim 19, wherein the auxiliary lubrication system further comprises one or more check valves for supporting compatibility of the auxiliary lubrication system with the main lubrication system.

* * * * *